ORA WEBSTER.
Improved Gaveling Forks for Harvesters.
No. 120,602. Patented Nov. 7, 1871.
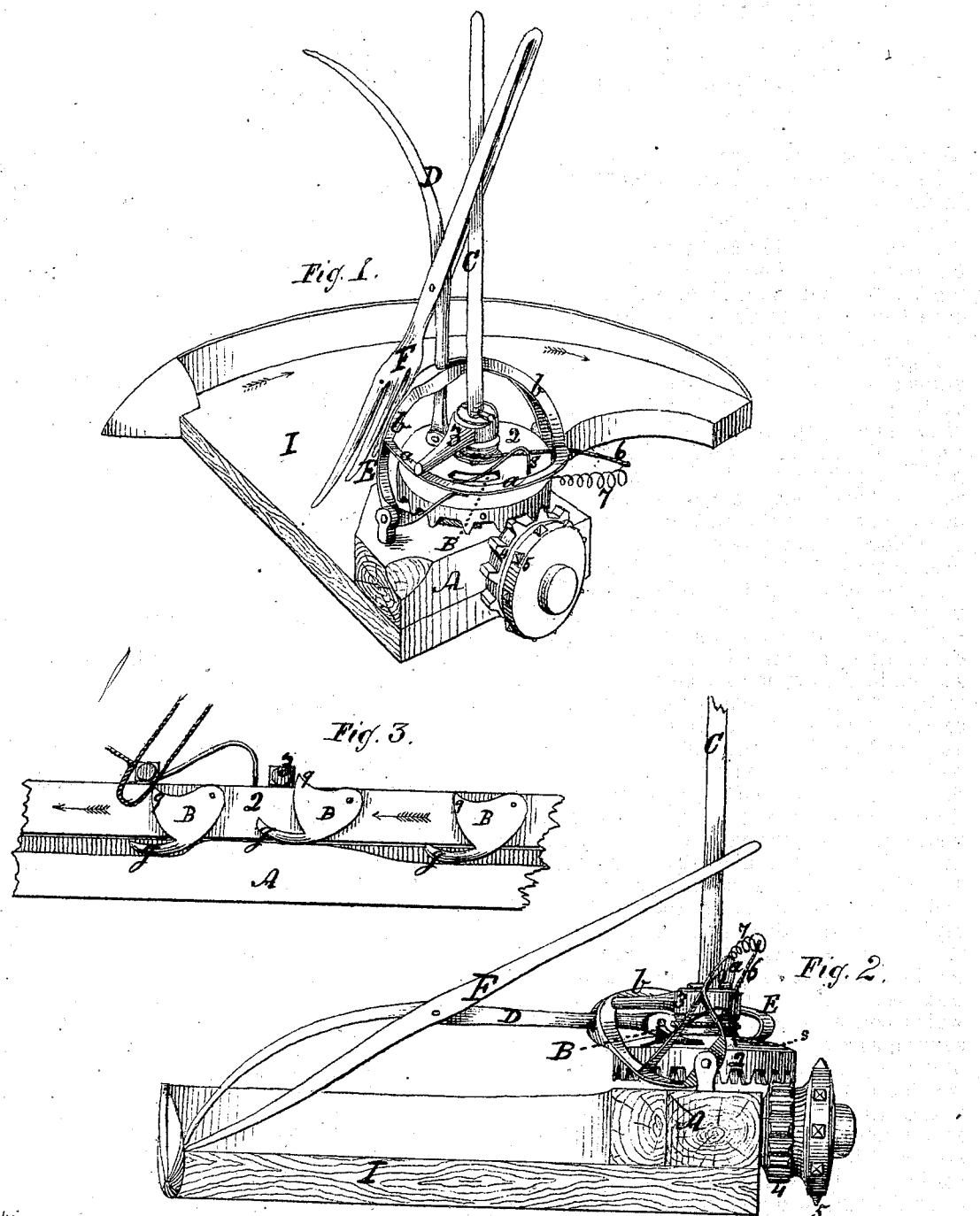

UNITED STATES PATENT OFFICE.

ORA WEBSTER, OF MURRAY, NEW YORK.

IMPROVEMENT IN GAVELING-FORKS FOR HARVESTERS.

Specification forming part of Letters Patent No. 120,602 dated November 7, 1871.

*To all whom it may concern:*

Be it known that I, ORA WEBSTER, of Murray, in the county of Orleans and State of New York, have made a new and useful Improvement in Automatic Gaveling-Forks for Harvesting-Machines; and I do hereby declare that the following is a full and exact description thereof, reference being had to the accompanying drawing and to the letters of reference marked thereon.

Figure 1 represents a perspective view of my automatic gaveling-fork connected with the harvester-platform. Fig. 2 represents a front view of the same with the fork in the position it will occupy when it has gathered the grain upon the platform preparatory to discharging it. Fig. 3 represents the relative positions of the traveling dog in relation to the cam-groove formed in the base-block and in relation to the fork-operating mechanism.

In the following description that side of the platform upon which the gearing is located, it will be understood, is the stubble side. The fork-operating mechanism is located upon the block A, and in the upper surface of this block there is formed a circular cam-groove, which is represented as rectilinear in Fig. 3 of the drawing, and in which the tongue of the dog B slides, as will be presently explained. The standard C is fixed in the base-block A and serves as a fixed shaft, upon which the crown-wheel 2 and arm 3, which are fastened together, revolve as upon an axle. The double-pinion wheel has a set of cogs, 4, meshing with the cogs of the crown-wheel, and its other and larger set of cogs 5 will be made to mesh with a suitable gear-wheel upon the side of the driving-wheel of a harvester. Interposed between the arm 3 and crown-wheel 2 there is a ring, which surrounds a tubular collar which connects arm 3 with the crown-wheel 2, serving as a pulley for the cord 6, and this ring-pulley is provided with ears to form the hinge by which the clamping-arm D is connected with this ring or ring-pulley. The movement of the arm D and the ring-pulley, to which it is hinged, is governed by the dog B, retracting spring 7, and cord 6, and by the rocking frame hereinafter described. The cord 6 is fastened to the hinge and to the spiral spring, as represented in Figs. 1 and 2. Two studs project above the base-block A; one near its front and the other near its rear; and to these studs the rock-frame E is hinged. Frame E, which has a slot formed at one side for the arm D to work in to govern the action of the gaveling-fork, has also two curved segments, *ab*, united so as to be at right angles in respect to each other, as represented in the drawing. The handle of the fork F is made with a long slot, through which the standard C projects, and it is pivoted to the arm D near its center and receives its movements through this connection. The dog B is pivoted or hinged in a slotted opening, which extends vertically through the crown-wheel 2. An inclined plane, *s*, made of a bent wire, which may be substituted by a spring, is fastened upon the upper side of the crown-wheel, and the office of this wire or spring is to assist the spring 7 and cord 6 to elevate the fork and the clamping-arm D when the gavel is discharged.

The operation of my gaveling device will now be described: The crown-wheel 2, by its revolution, carries the arm 3, to which it is connected by a collar on the shaft C, which arm slides upon the curved segments *a b* of the rocking frame E, and also carries the dog B, the tongue *g* of which moves around in the undulating cam-groove formed in the base-block A; and when the gaveling-fork E and arm D are in the position represented in Fig. 1, the rotation of the crown-wheel 2 with the arm 3 in the direction indicated by the arrows, arm 3 will strike the segment *b* of the rock-frame where it connects in front with segment *a*, and will cause the frame E to rock upon its hinges, and this will force the gaveling-fork F, through its connection with arm D, to be thrust under the grain which may be upon the platform I, and take the position represented in Fig. 2; and, at the same time, the arm D will close down upon the gavel, and then the dog B will rise as its tongue traverses the elevation in the bottom of the cam-groove, and it will project its curved ear *q* above the crown-wheel, so as to come in contact with the hinge of the arm D and force it and the gaveling-fork with the gavel to move around over the platform one-fourth of a circle to the rear of the base-block A; and, at the same time, the cord 6, which is fastened to the hinge of the arm D, will be wound upon its pulley, which will contract the spring 7. After the fork has arrived at the rear of the machine, as described, ready to deposit its gavel, the inclined plane or wire *s* will pass under the arm D, and, as it begins to elevate it, the dog B is released and will fall by its own gravity below the upper surface of the crown-wheel, and simultaneously arm 3 will act against segment *a* of frame E and rock it over until it assumes the position shown in Fig. 1, thus elevating the slotted side of the frame, in which slot the arm D travels. But when the dog B is released from its contact with the side of the hinge of arm D the spring 7 will, by its action upon cord 6, which winds upon the ring-pulley, cause the arm D and the fork F to quickly return to the position they occupied at the beginning, as represented in Fig. 1, and be in readiness to gather and deposit another gavel. The fork will remain stationary, however, while the arm 3 and crown-wheel with its dog B make half a revolution, and the latter comes again in contact with the hinge of arm D. The closing and opening operations of the gaveling-fork and arm D are produced by the rocking frame, in the elongated slot of which the arm D is placed, and by which it is guided and limited in its reciprocating movements with the fork. The spiral spring 7 and cord also act with the frame E in causing the fork to open and discharge its gavel. The spring 7 may be suitably incased, or any other suitable form of spring may be substituted to cause the gaveling device to return after discharging its gavel.

Instead of the circular platform a rectangular platform may be used.

To prevent the gavel from being forced too far up between the fork and arm D while gathering it suitable pins may be inserted in the fork at the junction of its tines and handle.

What I claim, and desire to secure by Letters Patent as my invention, is—

1. The fork F and arm D, in combination with the rocking frame E, constructed and operating substantially as described, for gathering the the gavel at the grain side of the platform, as specified.

2. The combination of the rocking frame E, crown-wheel 2, dog B, and arm 3, by which the gavel is carried in rear of the machine, substantially as and for the purpose specified.

3. The incline *s*, retracting spring 7, and its connections with the arm D, in combination with rocking frame E, by which the gavel is discharged and the fork is elevated and returned, substantially as described.

4. The combination of the crown-wheel with the arm 3, standard C, intermediate ring-pulley, and hinged arm D, operating substantially as and for the purpose described.

5. The combination of the slotted fork-handle with the standard C and arm D, connected and operating conjointly in the manner and for the purpose described.

In testimony hereof I have hereunto set my hand this 30th day of August, A. D. 1871.

ORA WEBSTER.

Witnesses:
H. P. K. PECK,
A. C. PARSONS.

(74)